United States Patent [19]

Sellers et al.

[11] Patent Number: 5,035,406
[45] Date of Patent: Jul. 30, 1991

[54] VARIABLE RATE SECONDARY SPRING FOR A PRIMARY LEAF SUSPENSION SPRING

[75] Inventors: Roger G. Sellers, Fenton; George R. Schmidt, St. Louis, both of Mo.

[73] Assignee: Moog Automotive, Inc., St. Louis, Mo.

[21] Appl. No.: 321,181

[22] Filed: Mar. 9, 1989

[51] Int. Cl.$^5$ ............................................. F16F 1/22
[52] U.S. Cl. ..................................... 267/48; 267/45; 267/265; 280/718
[58] Field of Search ................... 267/42, 43, 44, 45, 267/48, 52, 47, 158, 260, 265; 280/718

[56] References Cited

U.S. PATENT DOCUMENTS

| | | | |
|---|---|---|---|
| 606,386 | 11/1926 | Rouanet | 267/48 |
| 621,962 | 3/1927 | Stringer | 267/45 |
| 671,675 | 5/1928 | Hansen | 267/48 |
| 854,442 | 4/1932 | Baird | 267/48 |
| 860,656 | 5/1932 | Crabtree | 267/48 |
| 901,287 | 3/1933 | Corriveau | 267/52 |
| 915,227 | 3/1909 | Scott | 267/48 X |
| 1,778,887 | 10/1930 | Crabtree | 267/48 |
| 3,069,150 | 12/1962 | Lenett | 267/48 |

FOREIGN PATENT DOCUMENTS

| | | | |
|---|---|---|---|
| 1208664 | 7/1986 | Canada | 267/32 |
| 503316 | 7/1930 | Fed. Rep. of Germany | 267/48 |
| 3637281 | 1/1988 | Fed. Rep. of Germany | 267/48 |
| 1364671 | 8/1974 | United Kingdom | 267/48 |

Primary Examiner—George E. A. Halvosa
Attorney, Agent, or Firm—Gravely, Lieder & Woodruff

[57] ABSTRACT

A vehicle spring suspension system comprising a primary spring and a secondary spring attached to the primary spring for aiding the primary spring to restore vehicle height and to carry increasing loads placed on or in the vehicle. The secondary spring is connected at one end by an assembly which can have serveral different arrangments for varying the load supporting function of the secondary spring on the primary spring, depending on the need for more or less load carrying cooperation between the primary and secondary springs.

4 Claims, 2 Drawing Sheets

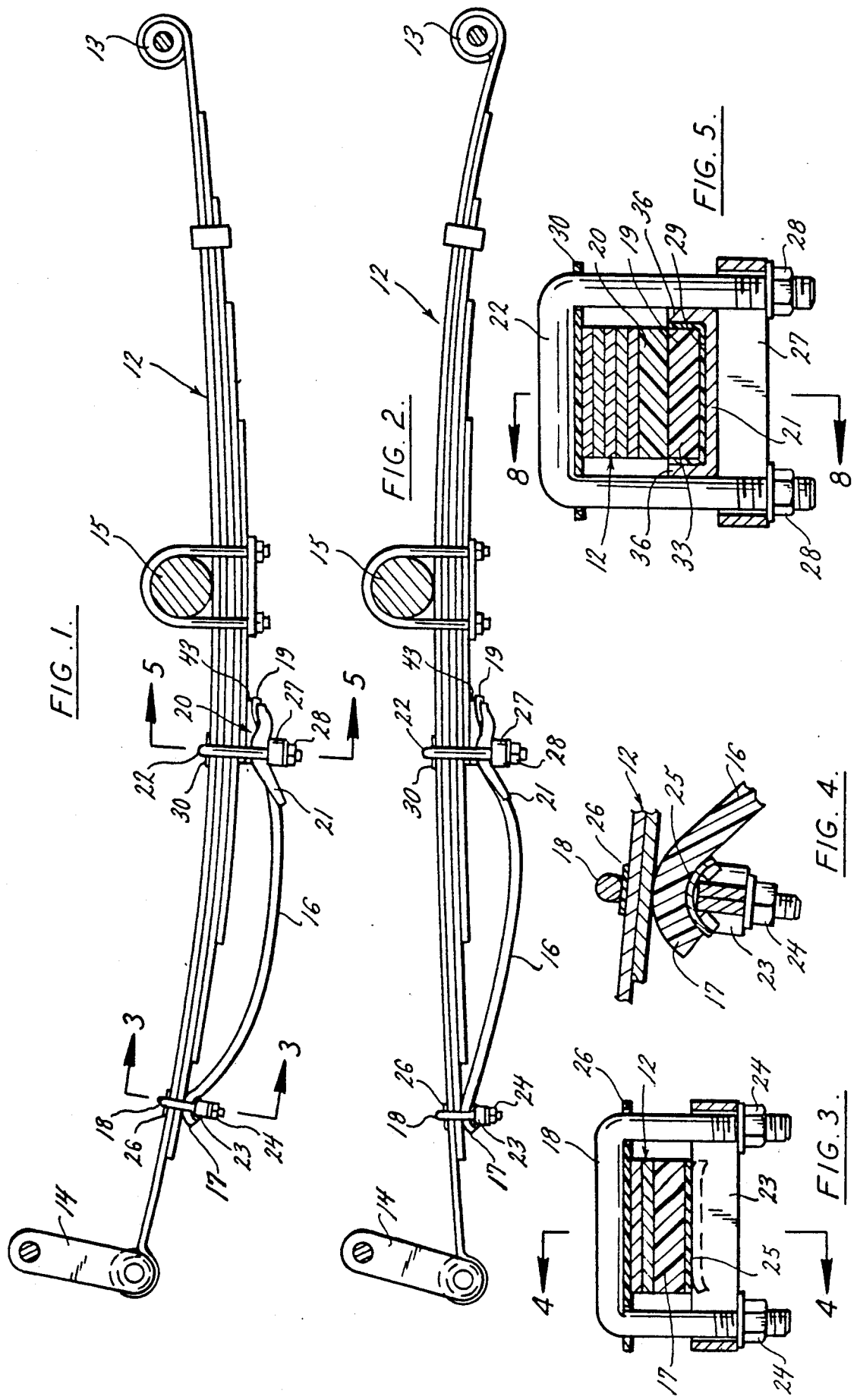

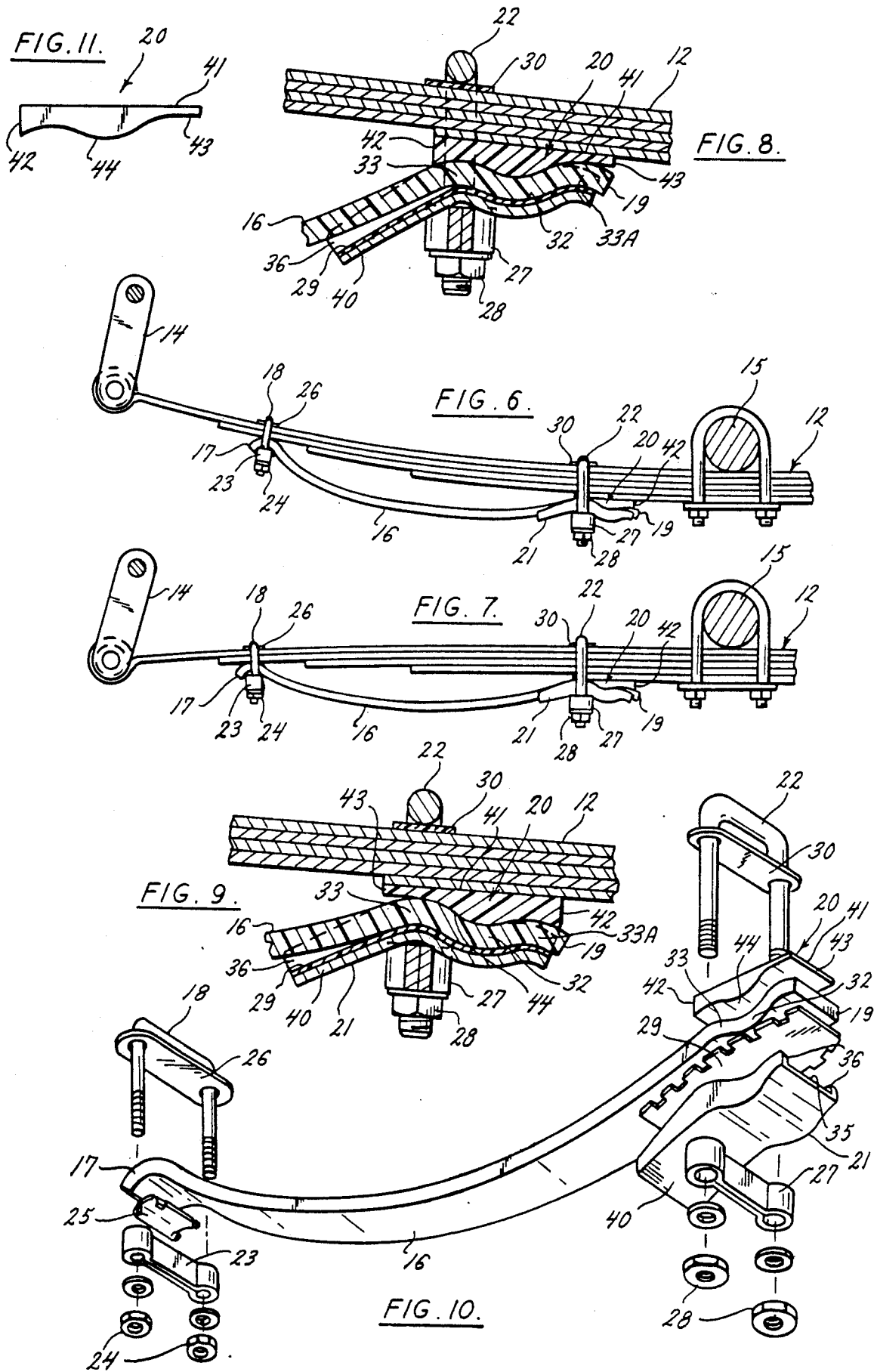

VARIABLE RATE SECONDARY SPRING FOR A PRIMARY LEAF SUSPENSION SPRING

BACKGROUND OF THE INVENTION

1. Field of the Invention

This invention pertains to helper or secondary spring for use in combination in a vehicle suspension system with a primary leaf spring.

2. Description of the Prior Art

In vehicles equipped with leaf springs as the source of primary suspension, it very often happens that higher than average loads are transported, contrary to the more typical presumed load limits usually encountered. Increased loading of primary leaf springs accelerates the process of permanent deformation of such springs which, in turn, allows the vehicle body to lose its trim height, and that creates a loss of handling and further reduction in load carrying capacities.

Many different solutions have been proposed and tried, such as the overload spring disclosed in U.S. Pat. No. 2,826,407 of Mar. 11, 1958 for one example. Another example is seen in U.S. Pat. No. 3,672,656 of June 27, 1972. Then there are leaf springs formed from composite and non-metallic materials such as U.S. Pat. No. 3,900,357 of Aug. 19, 1975 and U.S. Pat. No. 4,786,033 of Nov. 22, 1988. These last two patents disclose primary leaf springs using non-metallic materials. Even with primary springs using composite non-metallic materials, it is useful to provide secondary springs to help carry added loads that may be unintentionally or intentionally loaded on. In this class is the overload spring of U.S. Pat. No. 3,039,759 of June 19, 1962.

SUMMARY OF THE INVENTION

The invention to be set forth below is directed to a unique construction of a secondary spring for use with a primary leaf spring to provide variable rate selections to extend the load carrying capacity of the primary spring.

An important object of the invention is to provide means working with a secondary spring so that the means may be installed in one of two positions to give the secondary spring improved utility as a load helper for the same vehicle.

A further object of the present invention is to provide a unique system of components to work with a preformed end of a secondary spring to allow for the selection of increased load carrying ability of a primary spring and a low stiffner characteristic.

Yet another object of the present invention is to combine with a secondary load helper spring a unique assembly of mounting plate means to work progressively with load increases on the primary spring to bring the secondary spring into a working relation whereby increased support for loads can be accomplished.

In addition, the present invention provides a secondary spring which can be mounted on a primary spring without any need to drill holes in the spring system.

BRIEF DESCRIPTION OF THE DRAWINGS

The invention is disclosed in several embodiments in the following drawings, wherein:

FIG. 1 is a side elevational view of a multileaf spring formed with a forward attachment eye and a rearward shackle support, together with its attachment to an axle, the view further disclosing a secondary spring assembled in a first support condition;

FIG. 2 is a view similar to FIG. 1 but illustrating the composite primary and secondary springs in a full jounce reaction;

FIG. 3 is a transverse sectional detail of the attachment of the anchor end of the secondary spring to the primary spring; the view being taken along line 3—3 in FIG. 1;

FIG. 4 is a fragmentary sectional view taken along line 4—4 in FIG. 3;

FIG. 5 is a transverse sectional view of the attachment of the secondary spring to the primary spring, as seen along line 5—5 in FIG. 1, to show the components of that attachment;

FIG. 6 is a fragmentary side elevational view of a primary spring showing an alternate attachment of a secondary spring;

FIG. 7 is a view similar to FIG. 6 but with the primary and composite secondary springs in a condition of a full jounce;

FIG. 8 is an enlarged sectional view of the secondary spring attachment to the primary spring for the attachment seen in FIG. 1;

FIG. 9 is an enlarged sectional view similar to FIG. 8, but illustrating the attachment of the secondary spring to the primary spring as seen in FIG. 6;

FIG. 10 is an enlarged and exploded perspective view of a secondary spring to show the elements and components for its attachment to a primary spring for the condition seen in FIG. 1; and FIG. 11 is a side elevational view of a component adapter block for interchangable installation as seen in FIGS. 8 and 9.

DETAILED DESCRIPTION OF THE EMBODIMENTS

As illustrated in FIG. 1, a multi leaf primary leaf spring 12 is shown as providing a fixed eye 13 at its forward end relative to the direction of the movement of the vehicle on which the spring is mounted, and a shackle support 14 at the opposite end of the spring 12. The spring is attached to the vehicle axle 15 in the usual manner, as illustrated. In the view of FIG. 1 the spring 12 has been shown in its normal position with its vehicle in its standing position. The same spring has been illustrated in FIG. 2 under a condition of a full jounce reaction of the weight of the vehicle exerted against the primary spring 12 thereby showing the reaction of the secondary spring.

The subject matter of this invention resides in the characteristics of the secondary spring 16 which is attached to the primary spring 12 in the following way. The secondary spring 16 is formed with an anchor end 17 which is held in fixed position by a U-bolt 18, and the opposite or forward end 19 of the secondary spring is attached to the primary spring through the combination of a block element 20 and a variable rate support member 21, the details of which will be set forth presently. The characteristic difference illustrated in comparing FIG. 1 with FIG. 2 is that in FIG. 2 the secondary spring 16 has been decreased in its curvature because of the jounce reaction of the primary spring. That difference can be noticed by the relative positions between the end 19 of the secondary spring in the support member 21. The assembly of the block 20 and support 21 to the primary spring is effected through U-bolt 22 which is well understood in this art.

Turning now to FIG. 3 the U-bolt 18 is seen to be utilized to support the end 17 of the secondary spring 16 by a clamp 23 which is tightened down by threaded nuts 24 pressing the clamp against a curved pad 25 which prevents direct contact of the clamp 23 against the anchor end 17 of the secondary spring 16. It can be seen the U-bolt 18 is drawn down by the nuts 24 on the adjacent leafs of the primary spring 12 and a pad 26 is placed over the spring leafs and under the U-bolt. This U-bolt is only tightened a modest amount so as to allow for minimal sliding contact between end 17 of the secondary spring 16 and primary spring 12.

A further detail of the assembly seen in FIG. 3 is shown in FIG. 4 where the anchor end 17 of the secondary spring 16 is attached to the primary spring leafs 12 by the clamp 23 which presses upwardly against the pad 25 when the nuts 24 are drawn up on the legs of the U-bolt 18.

FIG. 5 is a fragmentary transverse sectional detail as seen along the lines 5—5 in FIG. 1 of the U-bolt 22 which retains an assembly of end 19 of the secondary spring 16 in its operative position with respect to the primary spring leafs 12. As depicted in this view the clamp 27 is drawn up on the legs of the U-bolt 22 by the nuts 28 so that the support member 21 and a pad 29 carried by the member 21 lifts the end 19 of the secondary spring 16 upwardly against the under side of the block 20 so that the block 20 is pressed against the surface of the bottom leaf in the primary spring 12, and a suitable pad 30 is inserted under the head of the U-bolt 22 to rest on top of the primary spring 12.

Turning now to FIG. 6 and 7, it can be appreciated, from the previous description of FIGS. 1 and 2, that the primary spring 12 which is attached to the axle 15 is seen in it normal standing position in FIG. 6, and in its full jounce reaction position in FIG. 7. It is of course recognized the rearward mount end of the primary spring 12 is supported in a shackle 14 as previous referred to. The connection of the anchor end 17 of the secondary spring 16 is identical with the disclosure described in FIGS. 3 and 4 and no further description appears to be necessary. On the other hand the opposite or forward end of the secondary spring is attached in a different manner to the primary spring than that illustrated and described in connection with FIG. 1 and 2.

Looking now at FIG. 8 and FIG. 10 it is observed that the secondary (or helper) spring 16 has an action formation adjacent its end 19 in the form of a saddle configuration 32. The inner portion 33 of that saddle provides a place where the clamp 27 can be held by the U-bolt 22 when the nuts 28 are drawn up. In this case, the secondary spring 16 is formed of non-metallic components, such as elongated fibers held together in an epoxy resin matrix. Thus, the spring 16 needs to be protected from contact with metallic part 21, and to do that the assembly at the end 19 includes a plastic pad 29 set down inside a shallow recess 35 framed between raised marginal flanges 36 which confine the notched margins of the pad 29 within the recess 35. The saddle configuration 33 serves the purpose of allowing the clamp 27 to retain the end 19 of the secondary spring against being pulled out of the U-bolt 22.

There is another unique feature in the present construction of the assembly of components at the saddle shaped end 19 of the secondary spring 16. This feature is the combination of the configuration of a reversible block 20 (See FIG. 11), and the extension 40 on the support body 21. The block 20 has a flat back face 41, a thick end 42, a thin end 43, and a saddle or curved face 44 that is essentially the nesting converse of the saddle face 32 on the secondary spring. The reversibility of block 20 is shown by comparing its alternate positions as between FIG. 8 and FIG. 9.

Returning to FIGS. 1, 2 and 8, for a spring assembly having light loading, as opposed to fully loaded conditions, the block is shown with its thickened end 42 at the location of the U-bolt 22 so that the thin end 43 will allow the end 19 of the secondary spring 16 to approach the bottom leaf of the primary spring 12. Of course the curved or saddle face 44 must be set to nest with the saddle on the secondary spring 16. The nest support member 21, in conjunction with U-bolt 22, provides a rigid cantilever attachment for secondary spring 16. Thus, as a load increases, and the curvature of the primary spring goes into a reduced or negative curvature relative to the axle 15, the secondary spring 16 assumes a decreased curved position (see FIG. 2), and the body of the secondary spring 16 lies in or more in the extension 40 of the support 21. When this occurs, the secondary spring 16 offers increasing stiffness for more support for the primary spring 12.

However, the setting of block 20 in the alternate position as seen in FIGS. 6, 7 and 9, places the thin end 43 closer to the position of the U-bolt 22, and the thick end 42 adjacent the end 19 of the secondary spring 16. Now, in the normal attitude of the spring 12, the thick end 42 of the block holds the saddle end 33A of the secondary spring 16 down as the curved face 44 meshes with the saddle face 32. Concurrently the extension 40 on the support member 21 is angled upwardly toward the overlying secondary spring 16, thereby applying a greater preload or lift to primary spring 12 (see FIG. 9). Now in a full jounce attitude of the primary spring 12, the secondary spring 16 engages the extension portion 40 (See FIG. 7) and is caused to add its support to the primary spring 12. While the primary spring 12 may respond in a jounce condition, it can also illustrate a high load condition.

What is claimed is:

1. In a spring suspension system for a vehicle consisting of an elongated primary spring connected intermediate its length to the vehicle axle, and a secondary spring carried by the primary spring, the improvement in the assembly attachment of the secondary spring comprising:
   (a) an anchor end formed on the secondary spring for attachment to the primary spring;
   (b) a saddle formation formed on the end of said secondary spring opposite said anchor end; and
   (c) means provided for the attachment of said saddle formation formed on the end of said secondary spring to the primary spring, said attachment comprising,
      (1) a block element positioned between the primary spring and said secondary spring and having a flat face on one surface presented to said primary spring and extending throughout the length of said block element, and a curved face on a surface opposite said flat face, said curved face varying from a thin flat at one end to a thickened portion shaped to nest in said saddle formation on the secondary spring, said thin flat at one end being interchangably positionable selectively in a direction pointed toward said anchor end or toward the end opposite said anchor end, (2) an elongated support member having a mounting surface thereon formed to nest on said saddle formation of the secondary spring and an elongated extension surface projecting beyond said mounting surface to assume a position along side said secondary spring, and (3) clamp means to secure said block element and said support member on opposite sides of said secondary spring with said saddle formation of said secondary spring and to secure said block element and said support member to said primary spring.

2. The improvement in the attachment of the secondary spring as set forth in claim 1 wherein, with said block element having its thickened portion directed toward said anchor end of said secondary spring, the end of said saddle formation on said end of said secondary spring opposite said anchor end engages on said thin end portion at said one end of said block, and said extension surface on said support member is oppositely directed relative to said thin end and is angularly spaced from said secondary spring.

3. The improvement in the assembly attachment of the secondary spring as set forth in claim 1 wherein, with said block element having its thin flat end directed toward said anchor end of said secondary spring, said saddle formation on said end of said secondary spring opposite said anchor end engages on said thickened portion of said block, and said extension surface on said support member is angularly elevated toward said secondary spring.

4. The improvement set forth in claim 1, wherein said saddle formation on said secondary spring end opposite said anchor end cooperates with the corresponding shape of said support member and said block element so as to eliminate a sliding displacement between said secondary spring and a U-bolt.

* * * * *